US005765148A

United States Patent [19]
Kimura

[11] Patent Number: 5,765,148
[45] Date of Patent: Jun. 9, 1998

[54] DATABASE PROCESSING APPARATUS AND DATABASE PROCESSING METHOD FOR VARIABLE LENGTH OBJECTS, AND COMPUTER-READABLE MEMORY MEDIUM FOR STORING DATABASE PROCESSING PROGRAM

[75] Inventor: Yutaka Kimura, Tokyo, Japan

[73] Assignee: NEC Corporation, Tokyo, Japan

[21] Appl. No.: 734,694

[22] Filed: Oct. 12, 1996

[51] Int. Cl.$^6$ .................................................. G06F 17/30
[52] U.S. Cl. ......................................... 707/4; 707/1
[58] Field of Search ................................. 707/1, 2, 3, 4, 707/5, 6, 100, 200, 201; 705/35; 345/333; 395/200.45, 680, 200.59

[56] References Cited

U.S. PATENT DOCUMENTS

| | | | |
|---|---|---|---|
| 5,257,369 | 10/1993 | Skeen et al. | 395/680 |
| 5,339,392 | 8/1994 | Risberg et al. | 345/333 |
| 5,557,798 | 9/1996 | Skeen et al. | 705/35 |
| 5,604,899 | 2/1997 | Doktor | 707/3 |
| 5,652,882 | 7/1997 | Doktor | 707/201 |

OTHER PUBLICATIONS

"The C++ Programming Language", Bjarne Stroustrup, 1986, Chapter 5—Classes, pp. 133–167.

*Primary Examiner*—Thomas G. Black
*Assistant Examiner*—Ruay Lian Ho
*Attorney, Agent, or Firm*—Young & Thompson

[57] ABSTRACT

A variable length class definition in a program is converted by class definition conversion means P2 into a fixed length section data structure definition D4 and a variable length section data structure definition D5, which are supplied to a program code section D2. If reference is made to a variable length object D6 during the execution of the program, casting means P6 casts, via control means P4, the pointer to the variable length object D6 into the fixed length section data structure definition D4. Then the pointer variable of the fixed length data section to the variable length data section is taken out, and cast by the casting means P6 into the variable length section data structure definition D5. Variable reference means P7 finds the offset of the variable to be referred to in the variable length data structure definition D5, and takes out the value of the variable length data section.

12 Claims, 4 Drawing Sheets

```
class    Picture
{
    date    Date;
    Char    Image [ ];
};
```

```
class    Picture fixed section
{
    Picture variable section *    vp;
};
class    Picture variable section
{
    date    Date;
    char*   cp;
};
``` aPicture → Image [99] = fixed_data;

DATABASE PROCESSING APPARATUS AND DATABASE PROCESSING METHOD FOR VARIABLE LENGTH OBJECTS, AND COMPUTER-READABLE MEMORY MEDIUM FOR STORING DATABASE PROCESSING PROGRAM

BACKGROUND OF THE INVENTION

1. Field of the Invention

The present invention relates to a database processing apparatus and a database processing method for storing and referring to variable length data (objects), and a recording medium for storing database processing programs.

2. Description of the Related Art

Data that can be handled by any conventional general purpose programming language, including C++ described in *The C++ Programming Language* (by Bjarne Stroustrup, published by Addison-Wesley in 1986), are only fixed length data.

For this reason, according to the prior art there is the problem that, when variable length data are to be referred to, the programmer has to define the structure of and the method to refer to variable length data, state the procedure to manage securing and releasing of the area for such data and that to refer to the contents of the variable length data by a method appropriate for their structure, and state functions specially prepared for handling the variable length data.

Accordingly, there is the additional problem that the number of steps of the program to refer to the variable length data increases, resulting in deteriorated quality and performance.

SUMMARY AND OBJECTS OF THE INVENTION

An object of the present invention is to improve the quality and performance of programs to refer to variable length data.

Another object of the invention is to allow the programmer to refer to data without having to be conscious of the data structure.

Still another object of the invention is to make it possible to refer to variable length data without having to modify the program by a special procedure or with a special function to refer to the variable length data.

Yet another object of the invention is to make it possible to refer to variable length data by the same program statement as that for referring to fixed length data.

According to a first aspect of the invention, there is provided a database processing apparatus for variable length objects consisting of:

- a memory apparatus including a variable length object consisting of a variable length data section including fixed length variables and variable length variables and a fixed length data section including a pointer to said variable length data section;

- a translation unit for generating and supplying to said memory apparatus a program code section by translating a statement of reference to a variable length variable in said variable length data section stated in a program and a definition statement of a variable length class; and

- an object reference execution unit for converting, when said program code section is executed and an instruction to refer to said variable length variable in said variable length data section in said variable length object is executed, a pointer to said variable length object so that reference can be made to said fixed length data section; then converting it by using said pointer to said variable length data section, stored in that fixed length data section, so that reference can be made to said variable length data section; further converting it so that reference can be made to said variable length variable in the variable length data section; and taking out the value of said variable length variable on the basis of the converted pointer to said variable length object.

According to a second aspect of the invention, there is provided a database processing apparatus for variable length objects equipped with:

- a memory apparatus including a variable length object consisting of a variable length data section including fixed length variables and variable length variables and a fixed length data section including a pointer to said variable length data section;

- a translation unit for generating and supplying to said memory apparatus a program code section by translating a statement of reference to a variable length variable in said variable length data section stated in a program; at the same time translating a definition statement of a variable length class given in that program to convert it into a definition of a fixed length section data structure corresponding to said fixed length data section and a definition of a variable length section data structure corresponding to said variable length data section; and supplying the converted definitions to said program code section; and

- an object reference execution unit for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the converted pointer to said variable length object.

According to a third aspect of the invention, there is provided a database processing apparatus for variable length objects equipped with:

- a memory apparatus including a variable length object consisting of a variable length data section including fixed length variables and variable length variables and a fixed length data section including a pointer to said variable length data section;

- an object reference conversion unit for generating and supplying to said memory apparatus a program code section by translating a reference statement for a variable length variable in said variable length data section stated in a program;

- a class definition conversion unit for translating a definition statement of a variable length class stated in said program to convert it into a definition of a fixed length section data structure corresponding to said fixed length data section and a definition of a variable length section data structure corresponding to said variable length data section, and supplying the converted definitions to said program code section of said memory apparatus;

a casting unit for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; and further converting it so that reference can be made to said variable length variable in that variable length data section by using said definition of variable length section data structure; and a variable reference unit for taking out the value of said variable on the basis of the pointer to said variable length object, which has been converted by said casting unit so that said variable length variable can be referred to.

According to a fourth aspect of the invention, there is provided a database processing apparatus for variable length objects equipped with:

a memory apparatus including a variable length object consisting of a variable length data section including fixed length variables and variable length variables and a fixed length data section including a pointer to said variable length data section;

a class definition conversion unit for translating a definition statement of a variable length class stated in a program to convert it into a definition of a fixed length section data structure corresponding to said fixed length data section and a definition of a variable length section data structure corresponding to said variable length data section, and supplying the converted definitions to said memory apparatus as program code section;

an object reference conversion unit for translating a reference statement for a variable length variable in said variable length data section stated in said program to generate a program code section and supplying it to said memory apparatus; converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the pointer to said variable length object, which has been converted.

According to a first aspect of the invention, there is provided a database processing method for variable length objects consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section, and a definition statement of a variable length class stated in that program; and an object reference execution step for converting, when said program code section is executed and an instruction to refer to said variable length variable in said variable length data section in said variable length object is executed, a pointer to said variable length object so that reference can be made to said fixed length data section; then converting it by using said pointer to said variable length data section stored in that fixed length data section so that reference can be made to said variable length data section; further converting it so that reference can be made to said variable length variable in the variable length data section; and taking out the value of said variable length variable on the basis of the converted pointer to said variable length object.

According to a second aspect of the invention, there is provided a database processing method for variable length objects consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section; at the same time translating a definition statement of a variable length class given in that program to convert it into a definition of a fixed length section data structure corresponding to said fixed length data section and a definition of a variable length section data structure corresponding to said variable length data section; and supplying the converted definitions to said program code section; and an object reference execution step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the converted pointer to said variable length object.

According to a third aspect of the invention, there is provided a database processing method for variable length objects consisting of:

an object reference conversion step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section;

a class definition conversion step for translating a definition statement of a variable length class stated in said program to convert it into a definition of a fixed length section data structure corresponding to said fixed length data section and a definition of a variable length section data structure corresponding to said variable length data section, and supplying the converted definitions to said program code section of said memory apparatus;

a casting step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; and further converting it so that reference can be made to said variable length variable in that variable length data section by using said definition of variable length section data structure; and a variable reference step for taking out the value of said variable on the basis of the pointer to said variable length object, which has been converted by said casting step so that said variable length variable can be referred to.

According to a fourth aspect of the invention, there is provided a database processing method for variable length objects consisting of:

a class definition conversion step for translating a definition statement of a variable length class stated in a program to convert it into a definition of a fixed length section data structure corresponding to said fixed length data section in a variable length data section in said variable length object consisting of a variable length data section including fixed length variables and variable length variables and a fixed length data section including a pointer to said variable length data section and a definition of a variable length section data structure corresponding to said variable length data section, and supplying the converted definitions to said memory apparatus as program code section;

an object reference conversion step for translating a reference statement for a variable length variable in said variable length data section stated in said program to generate a program code section and supplying it to said memory apparatus; converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the pointer to said variable length object, which has been converted.

According to a first aspect of the invention, there is provided a computer-readable memory medium for storing a program to cause a computer to execute a procedure consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section, and a definition statement of a variable length class stated in that program; and an object reference execution step for converting, when said program code section is executed and an instruction to refer to said variable length variable in said variable length data section in said variable length object is executed, a pointer to said variable length object so that reference can be made to said fixed length data section; then converting it by using said pointer to said variable length data section stored in that fixed length data section so that reference can be made to said variable length data section; further converting it so that reference can be made to said variable length variable in the variable length data section; and taking out the value of said variable length variable on the basis of the converted pointer to said variable length object.

According to a second aspect of the invention, there is provided a computer-readable memory medium for storing a program to cause a computer to execute a procedure consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section; at the same time translating a definition statement of a variable length class given in that program to convert it into a definition of a fixed length section data structure corresponding to said fixed length data section and a definition of a variable length section data structure corresponding to said variable length data section; and supplying the converted definitions to said program code section; and an object reference execution step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the converted pointer to said variable length object.

According to a third aspect of the invention, there is provided a computer-readable memory medium for storing a program to cause a computer to execute a procedure consisting of:

an object reference conversion step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section;

a class definition conversion step for translating a definition statement of a variable length class stated in said program to convert it into a definition of a fixed length section data structure corresponding to said fixed length data section and a definition of a variable length section data structure corresponding to said variable length data section, and supplying the converted definitions to said program code section of said memory apparatus;

a casting step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; and further converting it so that reference can be made to said variable length variable in that variable length data section by using said definition of variable length section data structure; and a variable reference step for taking out the value of said variable on the basis of the pointer to said variable length object, which has been converted by said casting step so that said variable length variable can be referred to.

According to a fourth aspect of the invention, there is provided a computer-readable memory medium for storing a program to cause a computer to execute a procedure consisting of a class definition conversion step for translating a definition statement of a variable length class stated in a program to convert it into a definition of a fixed length section data structure corresponding to said fixed length data section in a variable length data section in said variable length object consisting of a variable length data section including fixed length variables and variable length variables and a fixed length data section including a pointer to said variable length data section and a definition of a variable length section data structure corresponding to said variable length data section, and supplying the converted definitions to said memory apparatus as program code section;

an object reference conversion step for translating a reference statement for a variable length variable in said variable length data section stated in said program to generate a program code section and supplying it to said memory apparatus; converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the pointer to said variable length object, which has been converted.

BRIEF DESCRIPTION OF THE DRAWINGS

The invention will be understood more fully from the detailed description given here below and from the accompanying drawings of preferred embodiments thereof, which, however, should not be regarded as limiting the scope of the invention but are for explanation and helping understanding only.

Here, it should be noted that like reference numerals represent like elements throughout the disclosure.

DETAILED DESCRIPTION OF THE PREFERRED EMBODIMENTS

Preferred embodiments of the present invention will be described in detail below with reference to drawings.

Figure 1:
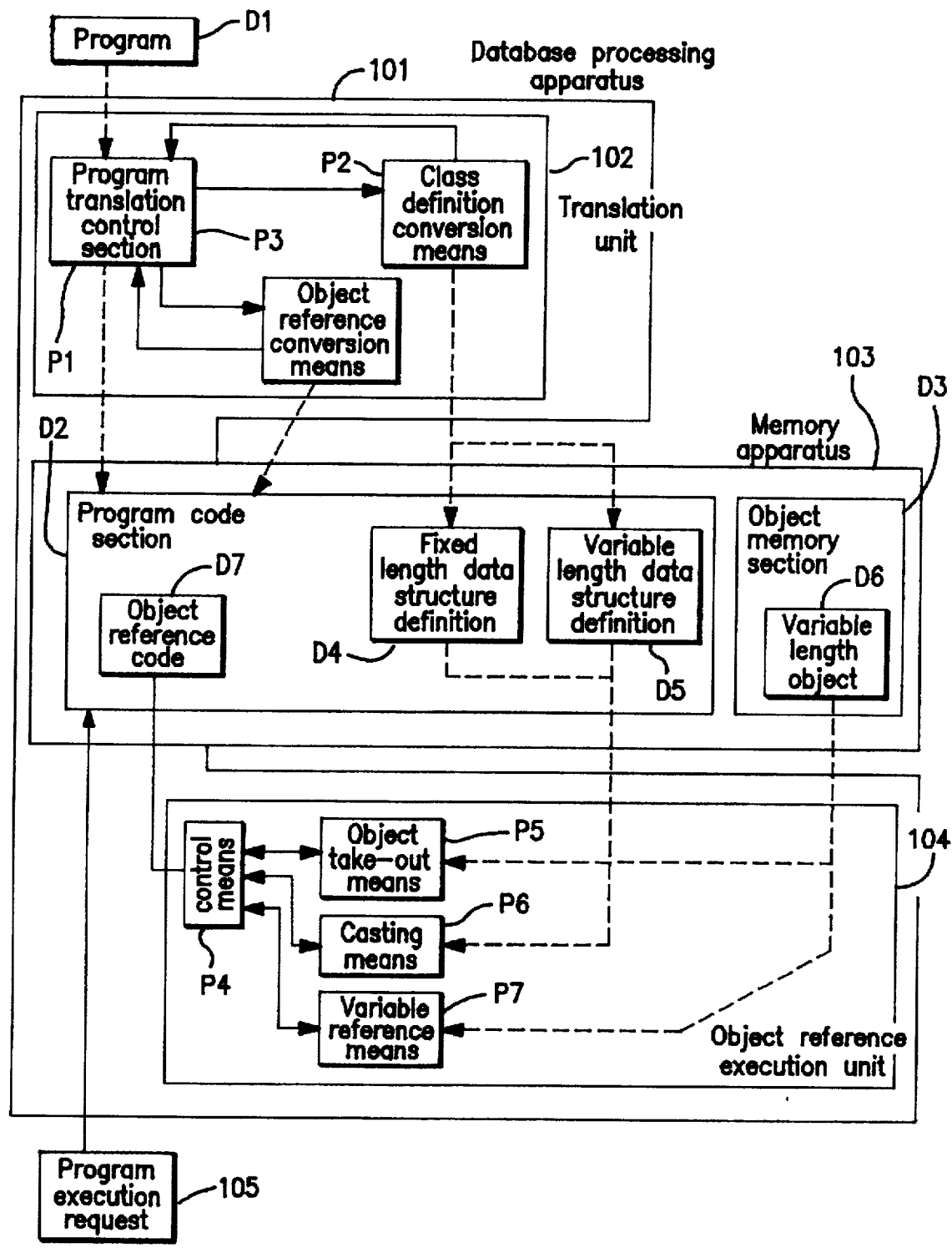
FIG. 1 is a block diagram illustrating a preferred embodiment of the invention.
Figure 2:
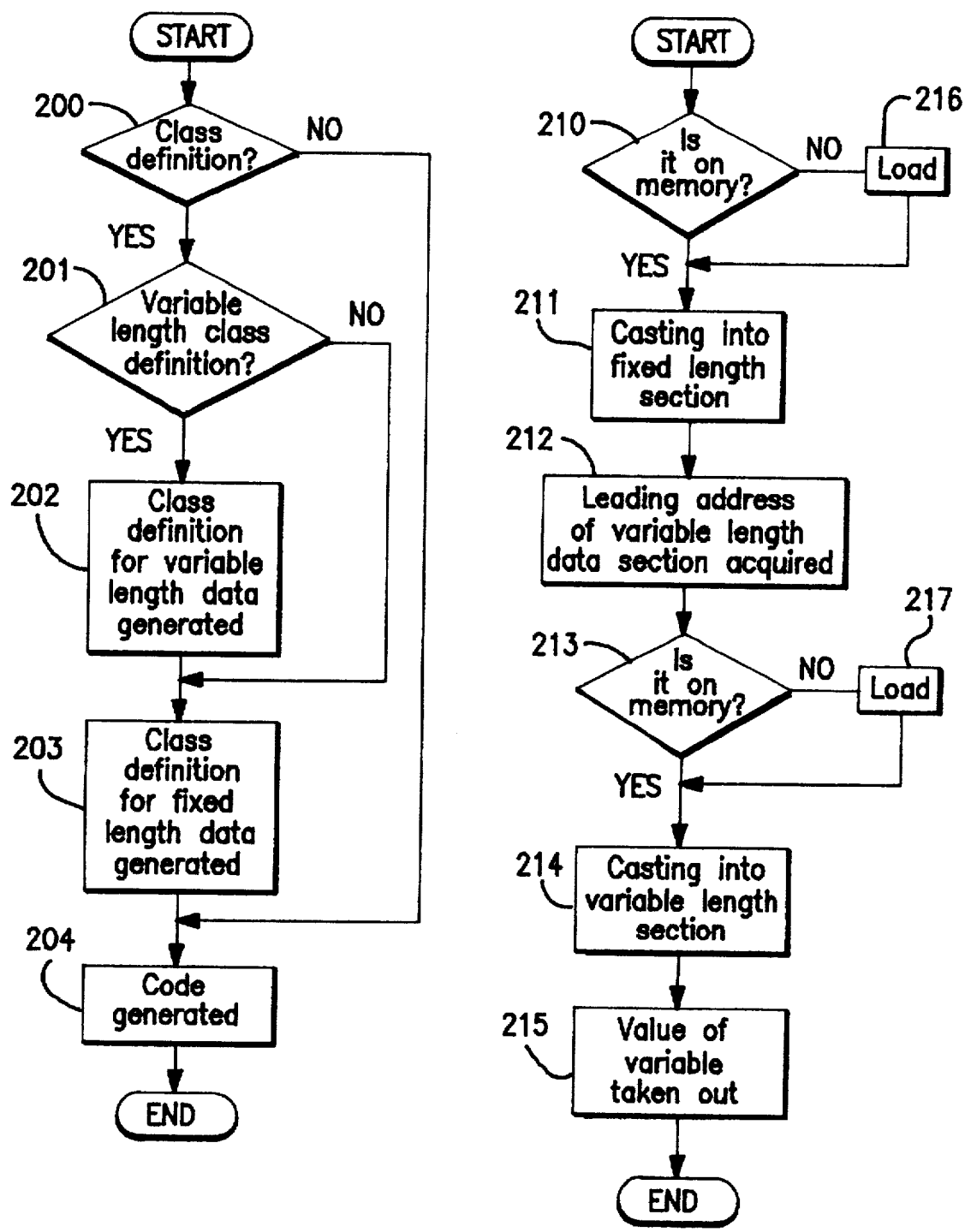
FIG. 2 is a flow chart of processing by the class definition conversion means P2, the control means P4, the casting means P6 and the variable reference means P7 in the embodiment of the invention.

Referring to FIG. 1, a database processing apparatus for variable length objects, which is a preferred embodiment of the invention, consists of a data processing apparatus 101 for executing compilers and user programs, and a memory unit 103 for storing information.

The database processing apparatus 101 consists of a translation unit 102 and an object reference execution unit 104.

The translation unit 102 is provided with class definition conversion means P2 for translating class definition statements in a program, object reference conversion means P3 for translating reference statements of variable length object variables in the program, and program translation control section P1 for controlling the class definition conversion means P2 and the object reference conversion means P3.

The object reference execution unit 104 is provided with object Lake-out means P5, casting means P6, variable reference means P7 and control means P4.

The memory apparatus 103 consists of a program code section D2 and an object memory section D3.

The program code section D2 is provided with an object reference code section D7, a fixed length section data structure definition section D4 and a variable length section data structure definition section D5.

The object memory section D3 stores a variable length object D6.

Figures 3, 4, 5, 6:
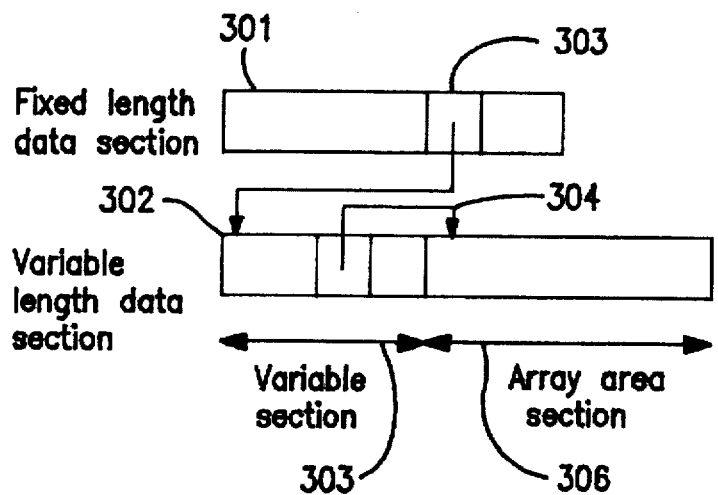
FIG. 3 illustrates the contents of the variable length object D6 in the embodiment of the invention.
FIG. 4 illustrates an example of program of a variable length class in the embodiment of the invention.
FIG. 5 illustrates an example of class definition converted by the class definition conversion means P2 in the embodiment of the invention.
FIG. 6 illustrates an example of program for referring to a variable length object in the embodiment of the invention.

Referring to FIG. 3, this variable length object D6 consists of a fixed length data section 301 and a variable length data section 302, whose address is held by a pointer variable 303 in the fixed length data section 301. The variable length data section 302 further consists of a variable section 305, which is the area of fixed length variables, and an array area section 306, which is the area of variable length variables (a variable length array). The position of the variable length array is pointed by a pointer variable 304 in the variable section 305.

The database processing apparatus for variable length objects, which is a preferred embodiment of the present invention, will be described below with reference to FIGS. 1 through 6.

A class definition statement in a program is translated by the class definition conversion means P2 via the program translation control section P1, and a reference statement for a variable length object variable in the program is translated by the object reference conversion means P3 similarly via the program translation control section P1, both being supplied to the program code section D2.

The class definition conversion means P2, when a class definition statement emerges in the program (step 200), decides whether or not that class definition statement defines a variable length class and, if it decides that a variable length class is defined, prepares on the basis of that class definition statement a fixed length section data structure definition section D4 and a variable length section data structure definition section D5 (step 203 and step 202), which are supplied to the program code section D2 (step 204). If, at step 201, it is decided that the class definition statement defines no variable length class, the class definition conversion means P2 prepares only a fixed length section data structure definition section D4 (step 203), and supplies it to the program code section D2 (step 204)

For example, in the class definition statement shown in FIG. 4, the class is named "picture", and holds as its instance variables a date type "date" and an "image" of a character type arrangement. The absence of size as bracketed subscript of the variable "image" means that this size is to be set/altered at the time of executing the program, i.e. it is variable.

When this class definition statement is entered into the translation unit 102, the program translation control section P1 hands over the control to the class definition conversion means P2. The class definition conversion means P2 divides the class definition statement into two classes—a class of "picture fixed section" and a class of "picture variable section". These classes respectively correspond to the fixed length section data structure definition section D4 and the variable length section data structure definition section D5.

Next will be described the operation of the object reference execution unit 104.

The program code section D2, supplied with the fixed length section data structure definition section D4 and the variable length section data structure definition section D5, starts execution on the basis of a program execution request 105. If a variable length object D6 is referred to, the control shifts to the control means P4 with the pointer to that variable length object D6 as argument.

The control means P4 refers to the variable length object D6 as described below.

The control means P4 decides whether or not the variable length object D6 is on the memory (step 210) and, if it decides it is on the memory, converts with the casting means P6 the pointer to that variable length object D6 into a form using the fixed length section data structure definition D4 (hereinafter the processing to convert the form and structure of data is called "casting") (step 211). Reference to variables in the fixed length data in the variable length object D6 is thereby made possible.

Next, the control means P4 takes out the pointer 303 to the variable length data section 302 in the fixed length data section 301 (step 212), decides whether or not the variable length data section 302 is on the memory (step 213) and, if it decides it is on the memory, casts with the casting means P6 the pointer 303 to the variable length data section 202 into a form using the variable length section data structure definition D5 (step 214). Reference to the variable length data section 302 in the variable length object D6 is thereby made possible. Furthermore, the variable reference means P7 refers to the array area section 306 with the pointer variable 304 to the variable length data section 302, and takes out the value of the variable length datum stored in that array area section 306 (step 215).

For instance, suppose that reference is made to a variable length object as illustrated in FIG. 6. If the pointer to the instance D6 of the picture class is already set to a variable "Picture" in FIG. 6, the 100th element of the array "image" which is its instance variable (note: as the first element in the array is referred to by subscript 0, the 100th is referred to by subscript 99) is rewritten in the program. If there is a formula of reference to the picture instance D6 as shown in FIG. 6, the control shifts to the control means P4. The control means P4 first calls the casting means P6, and casts with the casting means P6 the "aPicture" pointer to the class "picture fixed section" of FIG. 5. Thus, the area pointed by the "aPicture" pointer can now be referred to by the data structure D4 of class "picture fixed section". Then, as the instance variable "vp" pointer 303 of the picture fixed section points to the area of the picture variable section, this "vp" pointer 303 is cast with the casting means P6 to class "picture variable section" in FIG. 6. Thus, the area 302 pointed by the "vp" pointer 303 can now be referred to by the data structure D5 of class "picture variable section". In the data structure D5, the instance variables of the variable length class definition except the variable length array are mapped as they are to the variable section 305 of the variable length data section 302. Since the area 306 of the variable length array part is positioned at the end of the variable length data section 302, the variable section 305 of the data structure is "cp", the pointer variable 304 to that area. Eventually, the variable reference means P7 takes out the 100th element of the area pointed by "cp", i.e. the value of cp (99), and returns that value to the program code section D2.

Thus is completed the processing by the database processing apparatus for variable length objects, which is a preferred embodiment of the present invention.

The database processing apparatus for variable length objects, which is a preferred embodiment of the present invention, provides the benefit of enabling variable length data to be referred to by the same program statement as for referring to fixed length data without having to revise the program by using a special procedure or a special function for referring to variable length data.

Figure 7:
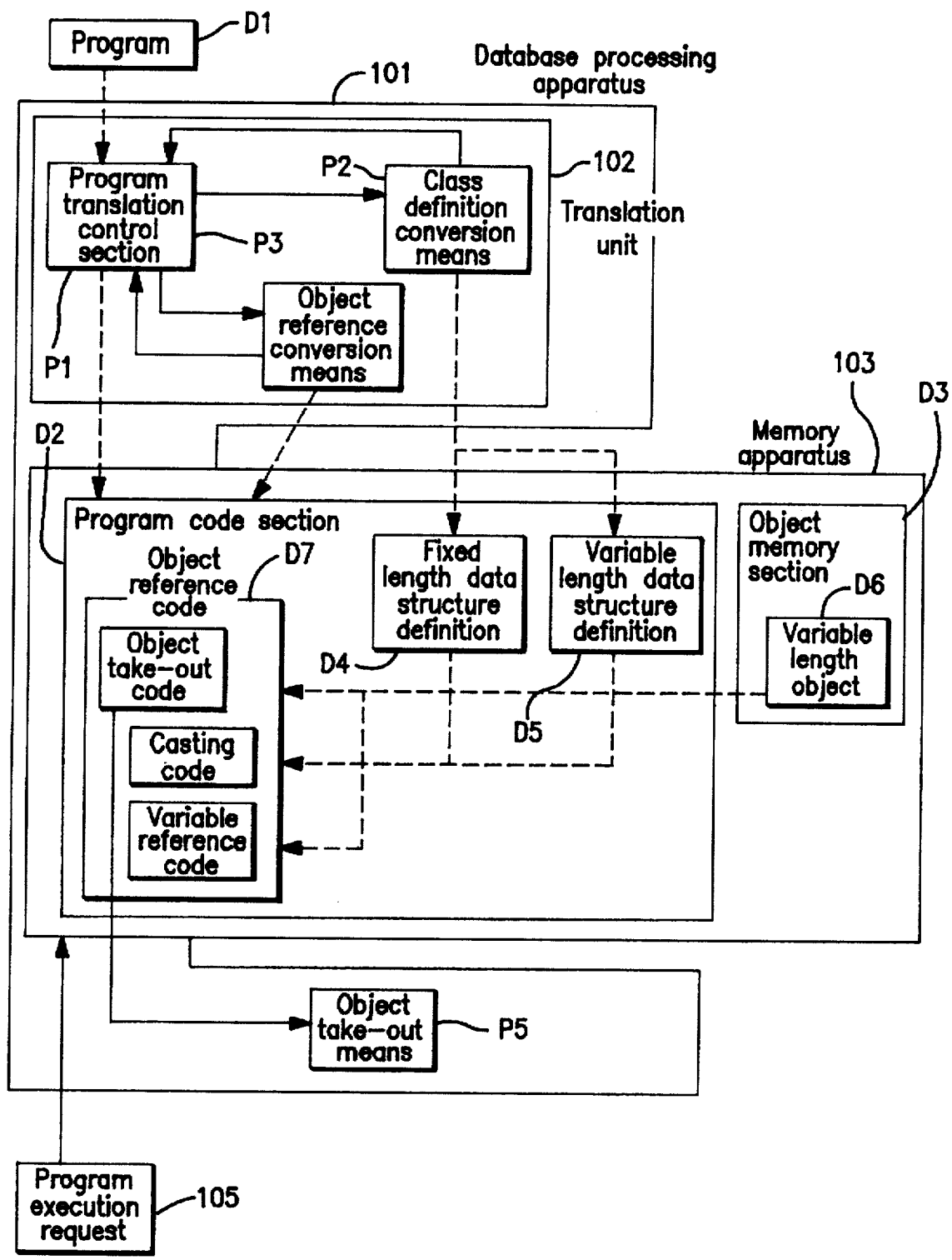
FIG. 7 is a block diagram illustrating another preferred embodiment of the invention.

FIG. 7 is a block diagram illustrating another preferred embodiment of the invention. In this embodiment, instead of using, in referring to a variable length object, the casting means P6 and the variable reference means P7 via the control means P4 of the database processing apparatus 101 shown in FIG. 1, the object reference conversion means P3 refers to the variable length object D6 by directly subjecting the functions of the casting means P6 and the variable reference means P7 to code development into the object reference code D7. It has to be noted, however, that this object reference code D7 includes a code to decide whether or not the desired object is present on the memory and, if it is not, to call the object take-out means P5 to load the object into the memory. This embodiment has the advantage of accelerating reference to a variable length object as much as the time saved by dispensing with calls on the control means P4, casting means P6 and variable reference means P7 because there is no need to call, in referring to the variable length object, the control means P4 or the casting means P6 and the variable reference means P7, which would otherwise have to be called via the control means P4 and, moreover, the database processing apparatus 101 need not be used as long as the variable length object is present on the memory.

As hitherto described, the database processing apparatus for variable length objects provides the benefit of enabling variable length data to be referred to by the same program statement as for referring to fixed length data without having to revise the program by using a special procedure or a special function for referring to variable length data.

It further provides the benefits of enabling the programmer to refer to data without having to be conscious of the data structure and improving the quality and performance of the program for referring to variable length data.

A program, which causes a computer to execute a procedure relating to a database processing method of the invention, is stored a computer-readable memory medium, i.e. a memory, a magnetic disk, an optical disk, a floppy disk and CD-ROM etc.

Although the invention has been described in detail above with reference to preferred embodiments thereof, it will be appreciated by those skilled in the art that these embodiments have been presented solely for the purpose of illustration, and are in no way to be regarded as limiting the scope of the invention. Instead, numerous variations, modifications and substitutions of equivalent techniques will be readily apparent to those skilled in the art upon reading this specification, and all such variations, modifications and substitutions are to be regarded as falling within the true scope and spirit of the invention.

What is claimed is:

1. A database processing apparatus for variable length objects provided with:

a memory apparatus including a variable length object consisting of a variable length data section including fixed length variables and variable length variables and a fixed length data section including a pointer to said variable length data section;

a translation unit for generating and supplying to said memory apparatus a program code section by translating a statement of reference to a variable length variable in said variable length data section stated in a program and a definition statement of a variable length class; and an object reference execution unit for converting, when said program code section is executed and an instruction to refer to said variable length variable in said variable length data section in said variable length object is executed, a pointer to said variable length object so that reference can be made to said fixed length data section; then converting it by using said pointer to said variable length data section, stored in that fixed length data section, so that reference can be made to said variable length data section; further converting it so that reference can be made to said variable length variable in the variable length data section; and taking out the value of said variable length variable on the basis of the converted pointer to said variable length object.

2. A database processing apparatus for variable length objects provided with:

a memory apparatus including a variable length object consisting of a variable length data section including fixed length variables and variable length variables and a fixed length data section including a pointer to said variable length data section;

a translation unit for generating and supplying to said memory apparatus a program code section by translating a statement of reference to a variable length variable in said variable length data section stated in a program; at the same time translating a definition statement of a variable length class given in that program to convert it into a definition of a fixed length section data structure corresponding to said fixed length data section and a definition of a variable length section data structure corresponding to said variable length data section; and supplying the converted definitions to said program code section; and an object reference execution unit for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the converted pointer to said variable length object.

3. A database processing apparatus for variable length objects equipped with:

a memory apparatus including a variable length object consisting of a variable length data section including fixed length variables and variable length variables and a fixed length data section including a pointer to said variable length data section;

an object reference conversion unit for generating and supplying to said memory apparatus a program code section by translating a reference statement for a variable length variable in said variable length data section stated in a program;

a class definition conversion unit for translating a definition statement of a variable length class stated in said program to convert it into a definition of a fixed length section data structure corresponding to said fixed length data section and a definition of a variable length section data structure corresponding to said variable length data section, and supplying the converted definitions to said program code section of said memory apparatus;

a casting unit for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; and further converting it so that reference can be made to said variable length variable in that variable length data section by using said definition of variable length section data structure; and a variable reference unit for taking out the value of said variable on the basis of the pointer to said variable length object, which has been converted by said casting unit so that said variable length variable can be referred to.

4. A database processing apparatus for variable length objects equipped with:

a memory apparatus including a variable length object consisting of a variable length data section including fixed length variables and variable length variables and a fixed length data section including a pointer to said variable length data section;

a class definition conversion unit for translating a definition statement of a variable length class stated in a program to convert it into a definition of a fixed length section data structure corresponding to said fixed length data section and a definition of a variable length section data structure corresponding to said variable length data section, and supplying the converted definitions to said memory apparatus as program code section;

an object reference conversion unit for translating a reference statement for a variable length variable in said variable length data section stated in said program to generate a program code section and supplying it to said memory apparatus; converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the pointer to said variable length object, which has been converted.

5. A database processing method for variable length objects consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section, and a definition statement of a variable length class stated in that program; and an object reference execution step for converting, when said program code section is executed and an instruction to refer to said variable length variable in said variable length data section in said variable length object is executed, a pointer to said variable length object so that reference can be made to said fixed length data section; then converting it by using said pointer to said variable length data section stored in that fixed length data section so that reference can be made to said variable length data section; further converting it so that reference can be made to said variable length variable in the variable length data section; and taking out the value of said variable length variable on the basis of the converted pointer to said variable length object.

6. A database processing method for variable length objects consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section; at the same time translating a definition statement of a variable length class given in that program to convert it into a definition of a fixed length section data structure corresponding to said fixed length data section and a definition of a variable length section data structure corresponding to said variable length data section; and supplying the converted definitions to said program code section; and an object reference execution step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the converted pointer to said variable length object.

7. A database processing method for variable length objects consisting of:

an object reference conversion step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section;

a class definition conversion step for translating a definition statement of a variable length class stated in said program to convert it into a definition of a fixed length section data structure corresponding to said fixed length data section and a definition of a variable length section data structure corresponding to said variable length data section, and supplying the converted definitions to said program code section of said memory apparatus;

a casting step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; and further converting it so that reference can be made to said variable length variable in that variable length data section by using said definition of variable length section data structure; and a variable reference step for taking out the value of said variable on the basis of the pointer to said variable length object, which has been converted by said casting step so that said variable length variable can be referred to.

8. A database processing method for variable length objects consisting of:

a class definition conversion step for translating a definition statement of a variable length class stated in a program to convert it into a definition of a fixed length section data structure corresponding to said fixed length data section in a variable length data section in said variable length object consisting of a variable length data section including fixed length variables and variable length variables and a fixed length data section including a pointer to said variable length data section and a definition of a variable length section data structure corresponding to said variable length data section, and supplying the converted definitions to said memory apparatus as program code section;

an object reference conversion step for translating a reference statement for a variable length variable in said variable length data section stated in said program to generate a program code section and supplying it to said memory apparatus; converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the pointer to said variable length object, which has been converted.

9. A computer-readable memory medium for storing a program to cause a computer to execute a procedure consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section, and a definition statement of a variable able length class stated in that program; and an object reference execution step for converting, when said program code section is executed and an instruction to refer to said variable length variable in said variable length data section in said variable length object is executed, a pointer to said variable length object so that reference can be made to said fixed length data section; then converting it by using said pointer to said variable length data section stored in that fixed length data section so that reference can be made to said variable length data section; further converting it so that reference can be made to said variable length variable in the variable length data section; and taking out the value of said variable length variable on the basis of the converted pointer to said variable length object.

10. A computer-readable memory medium for storing a program to cause a computer to execute a procedure consisting of:

a translation step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section; at the same time translating a definition statement of a variable length class given in that program to convert it into a definition of a fixed length section data structure corresponding to said fixed length data section and a definition of a variable length section data structure corresponding to said variable length data section; and supplying the converted definitions to said program code section; and an object reference execution step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the converted pointer to said variable length object.

11. A computer-readable memory medium for storing a program to cause a computer to execute a procedure consisting of:

an object reference conversion step for generating and supplying to a memory apparatus a program code section by translating a statement of reference, given in a program, to a pertinent variable length variable in a variable length object consisting of a variable length data section including fixed length variables and variable length variables and a fixed length data section including a pointer to said variable length data section;

a class definition conversion step for translating a definition statement of a variable length class stated in said program to convert it into a definition of a fixed length section data structure corresponding to said fixed length data section and a definition of a variable length section data structure corresponding to said variable length data section, and supplying the converted definitions to said program code section of said memory apparatus;

a casting step for converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; and further converting it so that reference can be made to said variable length variable in that variable length data section by using said definition of variable length section data structure; and a variable reference step for taking out the value of said variable on the basis of the pointer to said variable length object, which has been converted by said casting step so that said variable length variable can be referred to.

12. A computer-readable memory medium for storing a program to cause a computer to execute a procedure consisting of:

a class definition conversion step for translating a definition statement of a variable length class stated in a program to convert it into a definition of a fixed length section data structure corresponding to said fixed length data section in a variable length data section in said variable length object consisting of a variable length data section including fixed length variables and variable length variables and a fixed length data section including a pointer to said variable length data section and a definition of a variable length section data structure corresponding to said variable length data section, and supplying the converted definitions to said memory apparatus as program code section;

an object reference conversion step for translating a reference statement for a variable length variable in said variable length data section stated in said program to generate a program code section and supplying it to said memory apparatus; converting, when said program code section is executed and an instruction to refer to said variable length variable in said variable length data section in said variable length object is executed, a pointer to said variable length object so that reference can be made to said fixed length data section by using said definition of fixed length section data structure; then converting it by using said pointer to said variable length data section stored in that fixed length data section so that reference can be made to said variable length data section; further converting it so that reference can be made to said variable length variable in that variable length data section by using said definition of variable length section data structure; and taking out the value of said variable length variable on the basis of the pointer to said variable length object, which has been converted.

* * * * *

UNITED STATES PATENT AND TRADEMARK OFFICE
CERTIFICATE OF CORRECTION

PATENT NO. : 5,765,148
DATED      : June 9, 1998
INVENTOR(S): Yutaka KIMURA

It is certified that error appears in the above-indentified patent and that said Letters Patent is hereby corrected as shown below:

On the title page, add Item [30] as follows:

--[30]     Foreign Application Priority Data

October 19, 1995    [JP]     Japan.........7-270815--.

Signed and Sealed this

First Day of September, 1998

Attest:

BRUCE LEHMAN

*Attesting Officer*         *Commissioner of Patents and Trademarks*